United States Patent [19]

Huang

[11] Patent Number: 5,664,798

[45] Date of Patent: Sep. 9, 1997

[54] AUTOMATIC FOLDING FRAME FOR BABY CARRIAGE

[75] Inventor: Yung-Ha Huang, Tainan, Taiwan

[73] Assignee: Lu Kuang Incorporation, Tainan, Taiwan

[21] Appl. No.: 501,146

[22] Filed: Jul. 11, 1995

[51] Int. Cl.[6] .................................................. B62B 7/06
[52] U.S. Cl. .............................. 280/642; 16/112; 280/42; 297/488; 403/83
[58] Field of Search ............................ 16/111 R, 112, 16/125; 297/487, 488; 280/642, 42, 655, 655.1, 47.36, 47.371; 403/53, 83, 119

[56] References Cited

U.S. PATENT DOCUMENTS

| | | | |
|---|---|---|---|
| 4,565,388 | 1/1986 | Kassai | 280/42 X |
| 4,743,043 | 5/1988 | Shamie | 280/42 X |
| 5,181,735 | 1/1993 | Onishi | 280/42 X |
| 5,184,835 | 2/1993 | Huang | 280/47.371 |
| 5,261,682 | 11/1993 | Chuang | 280/42 |

Primary Examiner—Kevin Hurley
Assistant Examiner—Michael Mar
Attorney, Agent, or Firm—Morton J. Rosenberg; David I. Klein

[57] ABSTRACT

A foldable frame for a baby carriage which includes a flexible handrail and a pair of two-way toggle joints for connecting opposite ends of the handrail to a pair of spaced arms, each two-way toggle joint having a butt joint fixedly connected to a respective end of the handrail and a joint stand pivotally connected to a respective arm. The butt joint is pivotally connected to the joint stand by means of a pivot member. A latch member is pivotally mounted between lips of the joint stand. The latch member is biased by a spring into engagement with the pivot member. A groove formed within a forward end of the arm receives a portion of the latch member when the handrail in a fully extended position for preventing pivotal movement of the joint stand relative to the arm. The latch member is disengaged from the groove by a stop member associated with the butt joint when the handrail is pivoted horizontally to a folded position for permitting vertical pivotal movement of the joint stand and the folded handrail relative to the arm.

1 Claim, 7 Drawing Sheets

AUTOMATIC FOLDING FRAME FOR BABY CARRIAGE

BACKGROUND OF THE INVENTION

1. Field of the Invention

The present invention relates to an automatic folding frame for baby carriage, and more particularly to a coordinating the structure of baby carriage automatic setting and withdrawing in horizontal and vertical handrail frame.

2. Description of the Related Art

According to conventional baby carriage in general, due to prventing baby slipping away from the carriage, the forth part of baby carriage is set up a protecting rail style handrail for maintaining baby on the sit safely, referring to FIG. 7, showing one of conventional protection device (called handrial in the invention) frame; and common conventional handrail of baby carriage are active, it is installed or removed depending on the necessary, such as putting baby on or taking away, the handrail should be removed then installed; further, when withdrawing baby carriage, the handrail can be separated for reducing volume of the baby carriage.

On the other hand, with regard to conventional folding baby carriage, except removable handrail, they are in bending state; in according with the above mentioned conventional baby carriage, in which the protection device is a horizontal flexible handrail, because this design just has capability of horizontal bending and there is not any location frame on it, so it is not only unable to be telescoped efficiently also its fixedness and safety is not well.

The conventional baby carriage folding handrail frames have the following lacks:

1. During withdrawing baby carriage, the handrail is often removed firstly or released its locking point, then the baby carriage can be bent;
2. During unfolding, the handrail can not automatically set the coordinating body of the carriage; it is necessary to wait body of the carriage unfolded and fixed, the handrail is just set in other operation, and the body of the carriage and handrail are not synchronized in withdrawing and unfolding operation, so it makes operation be inconvenient and unstable;

Based on the above mentioned reasons, the object of the present invention is to provide an automatic folding frame for baby carriage, adopting a two-way toggle joint connecting handrail to arm of the baby carriage in pin joint, the toggle joint contains an automatic setting and releasing latch block for releasing and setting along with withdrawing and unfolding the carriage, and the two-way toggle joint has capabilities of horizontal and vertical bending concurrently.

SUMMARY OF THE INVENTION

The present invention provides an automatic folding frame for baby carriage, in which both ends of the flexible handrail are set up a two-way toggle joint separately, the toggle joint is constructed by an L-shaped joint stand and a couple of lips linked up a butt joint, the other end of the butt joint linked with the handrail, and there is a spring to withstand a latch among the couple of lips, the other end of the joint stand has an aperture of a hole for holding up a linking block with an elastic fastener, and the linking block is turnable in the joint stand; and a joint end of the said butt joint is appeared to a couple of lips corresponding to up and down, one side between the couple of lips is formed a stopper; and at the forth end of the arms, there is a fit channel corresponding to the shape of the said linking block, the bottom of the fit channel has a fastening hole corresponding to the elastic fastener of the linking block, and outside the forth end of the arm is set up a groove; based on the above-mentioned, the handrail can be connected to the fit channel of the arm by the linking block linked with the toggle joint, and the latch locks in the groove; during the handrail is withdrawn in horizontal direction along with the body of the carriage, the butt joints at both end of the handrail take advantage of the opportunity to turn an angle for resulting in the stopper at side of lips to push the latch away from the groove, next the handrail can be bent in vertical direction with the joint point of the butt joint and the joint stand.

BRIEF DESCRIPTION OF THE DRAWINGS

FIG. 4A is an enlarged cross-sectional view of an end portion of one of the toggle joints in the setting state of the present invention;

FIG. 5A is an enlarged cross-sectional view of an end portion of one of the toggle joints in the released state as shown in FIG. 5;

DESCRIPTION OF THE PREFERRED EMBODIMENT

Figure 1:
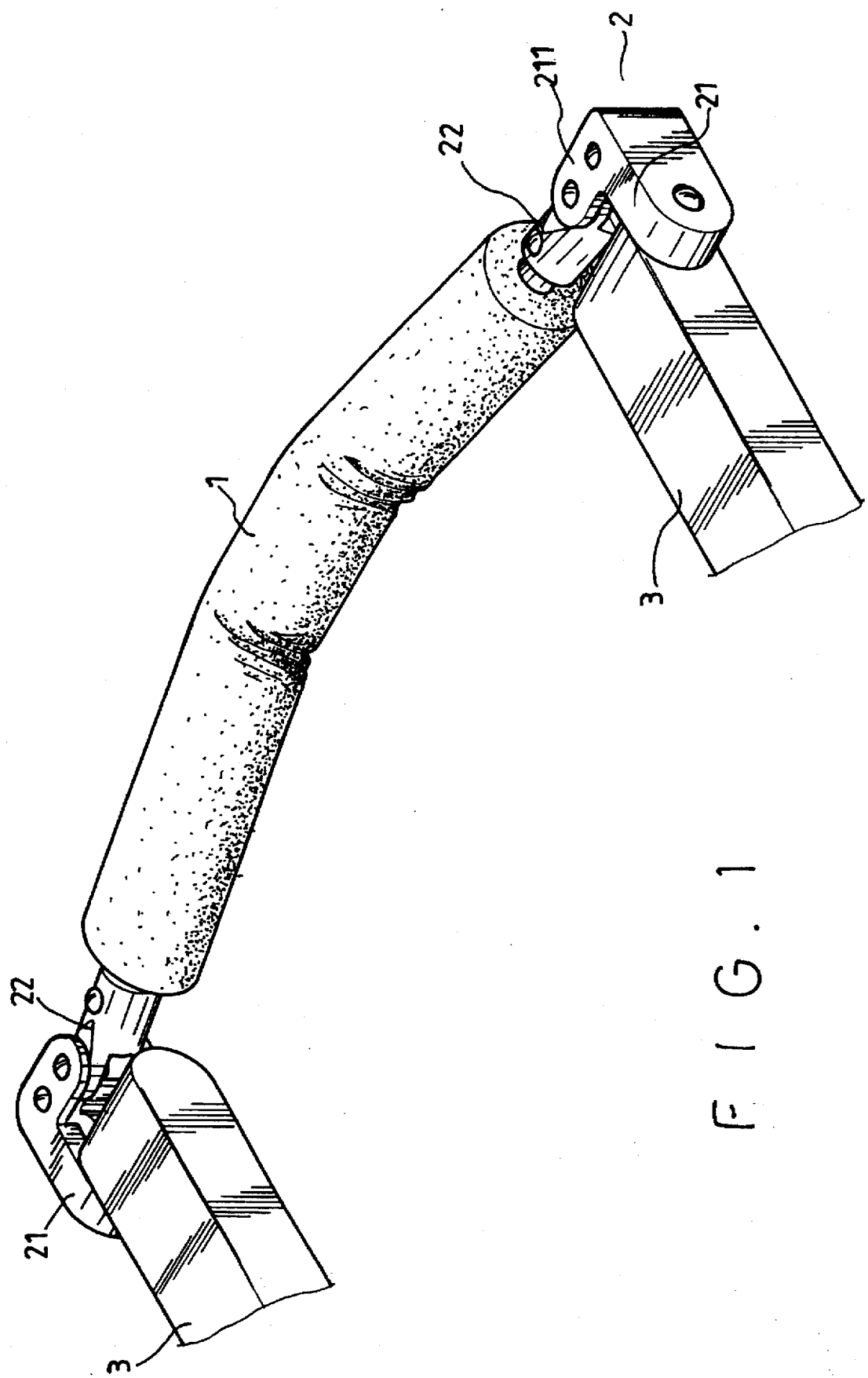
FIG. 1 is view showing the assembly of the present invention.
Figure 2:
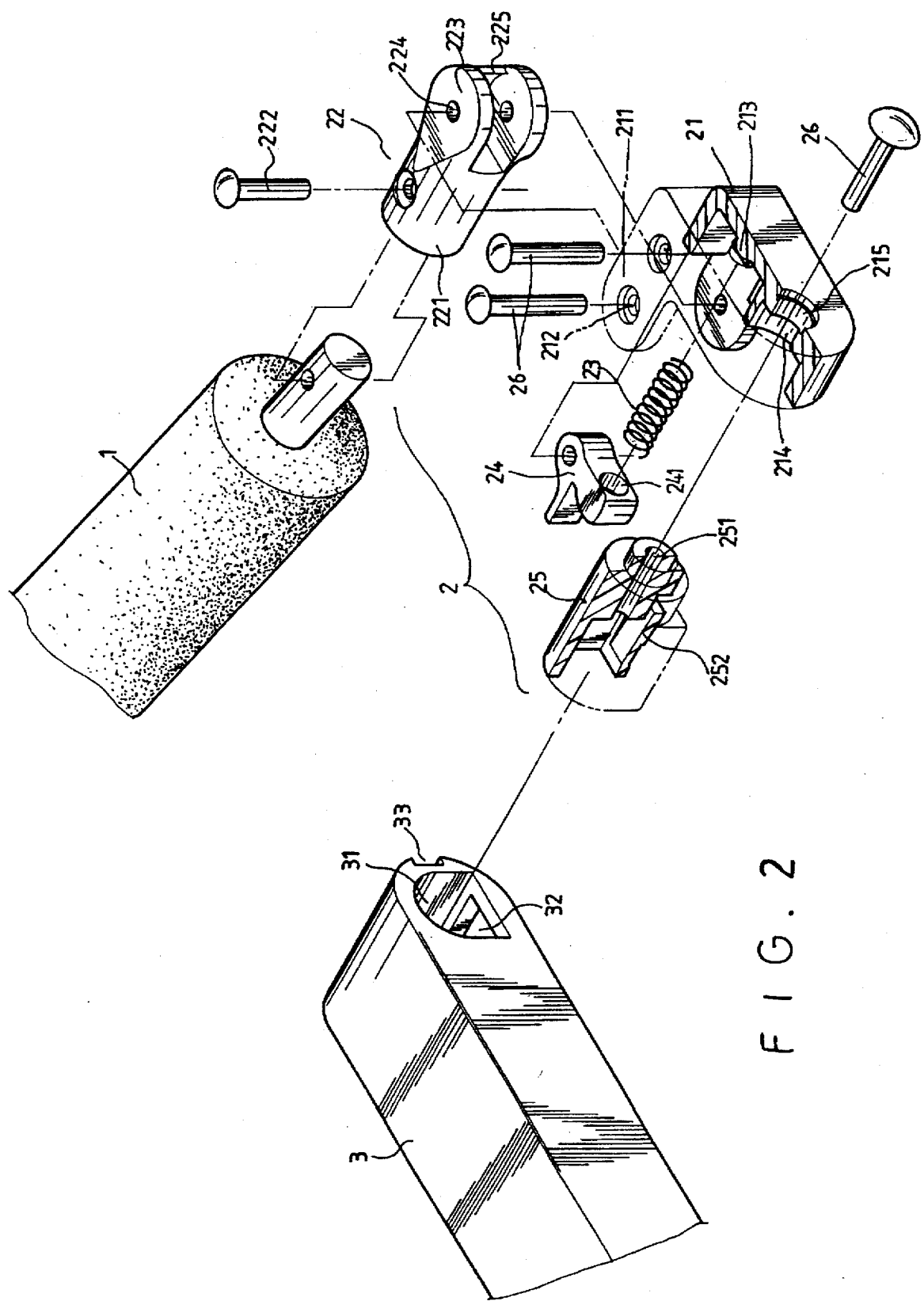
FIG. 2 is an exploded view of the present invention.

Referring to FIG. 1 and FIG. 2, the present invention includes a flexible handrail 1, two toggle joints 2 connected to two ends of the handrail 1 and two arms 3 linked with two toggle joints 2 by linking block, in which:

handrail 1 having two flxible pin joint points for folded in U-shaped;

toggle joint 2 consisted of a stand 21, a butt joint 22, a spring 23, a latch 24 and a linking block 25, in which appeared to L-shaped, one end of it formed a couple of lips 211 having a couple of bores 212 on it, a latch 24 riveted between the couple of lips 211 with a rivet 26 in pin point, one end of the latch 24 having a hole 241 for containing the spring 23 to withstand up, the other end of the spring 23 set on a pillaret 213 inside the joint stand 21, and the other end of the joint stand 21 having an aperture 214 with a hole 215, one end of the butt joint 22 having a sleeve 221 riveted on the end of the handrail 1 with a rivet 222, the other end of the butt joint 22 formed a couple of lips 223 having a couple holes 224 for inserting into the couple of lips 211 of the joint stand 21 and riveted by a rivet 26 through the bores 212 and the holes 224 in pin joint, one side between the couple of lips 223 formed a stopper 225, the linking block 25 being a flat of arch tube shaped, one end having a bore 251 for inserting into the aperture 214 of the joint stand 21 and riveted on the hole 215 and the hole 251 with a rivet 26, and the flat of it having a elastic fastener 252;

the forth end of arm 3 having a fit channel 31 corresponding to the linking block 25, on the bottom flat having a fastening hole 32 corresponding to the elastic fastener 252 of the linking block 25, and having a groove 33 on the top end edge;

based on the above-mentioned parts, the handrail 1 linked with the toggle joint 2 through the linking block 25 to inlay into the fit channel 31 of arm 3, and the elastic fastener 252 of the linking block 25 fastening into the fastening hole 32.

Figure 3:
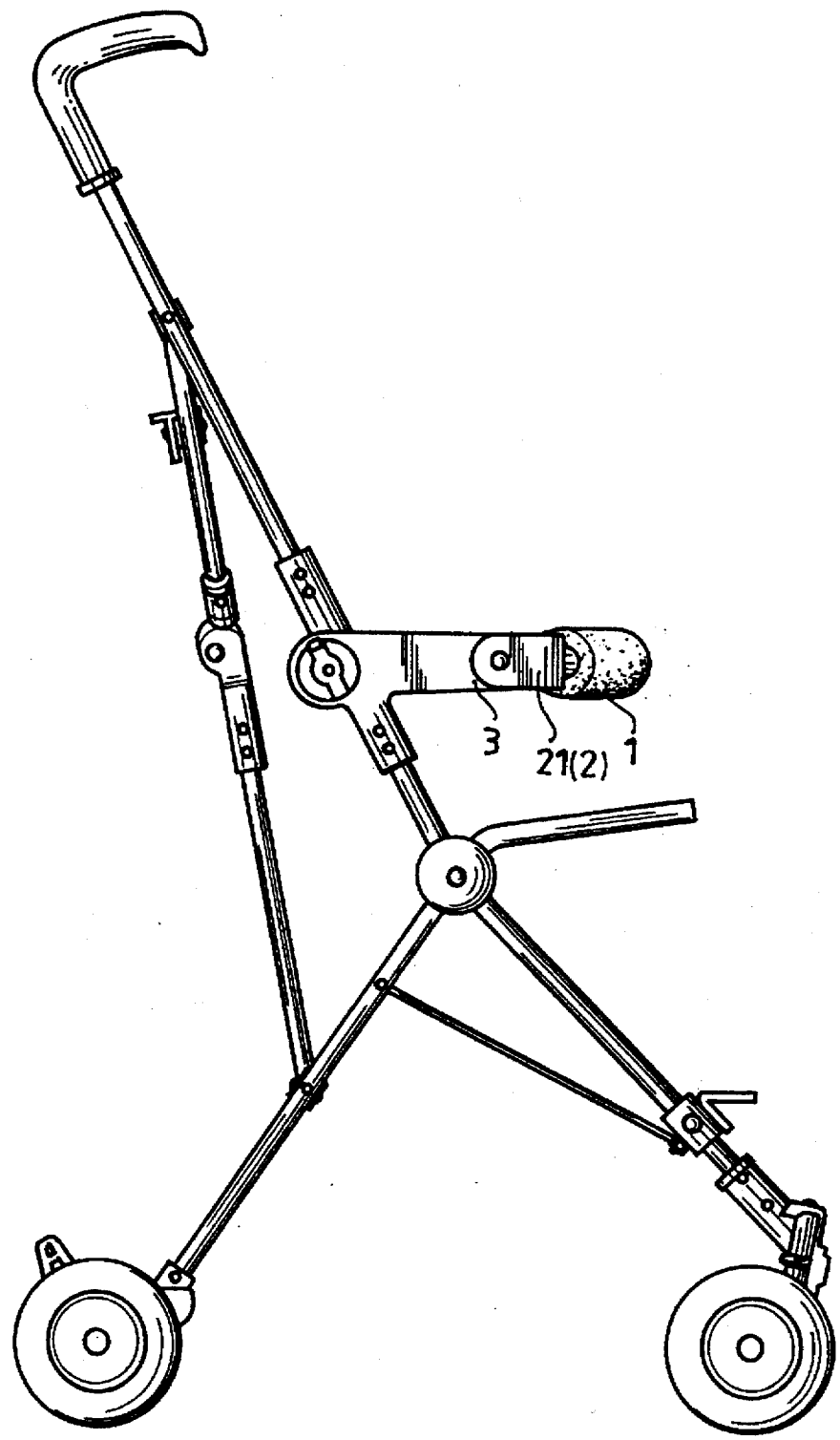
FIG. 3 is a side view showing an operation of the present invention.
Figure 4:
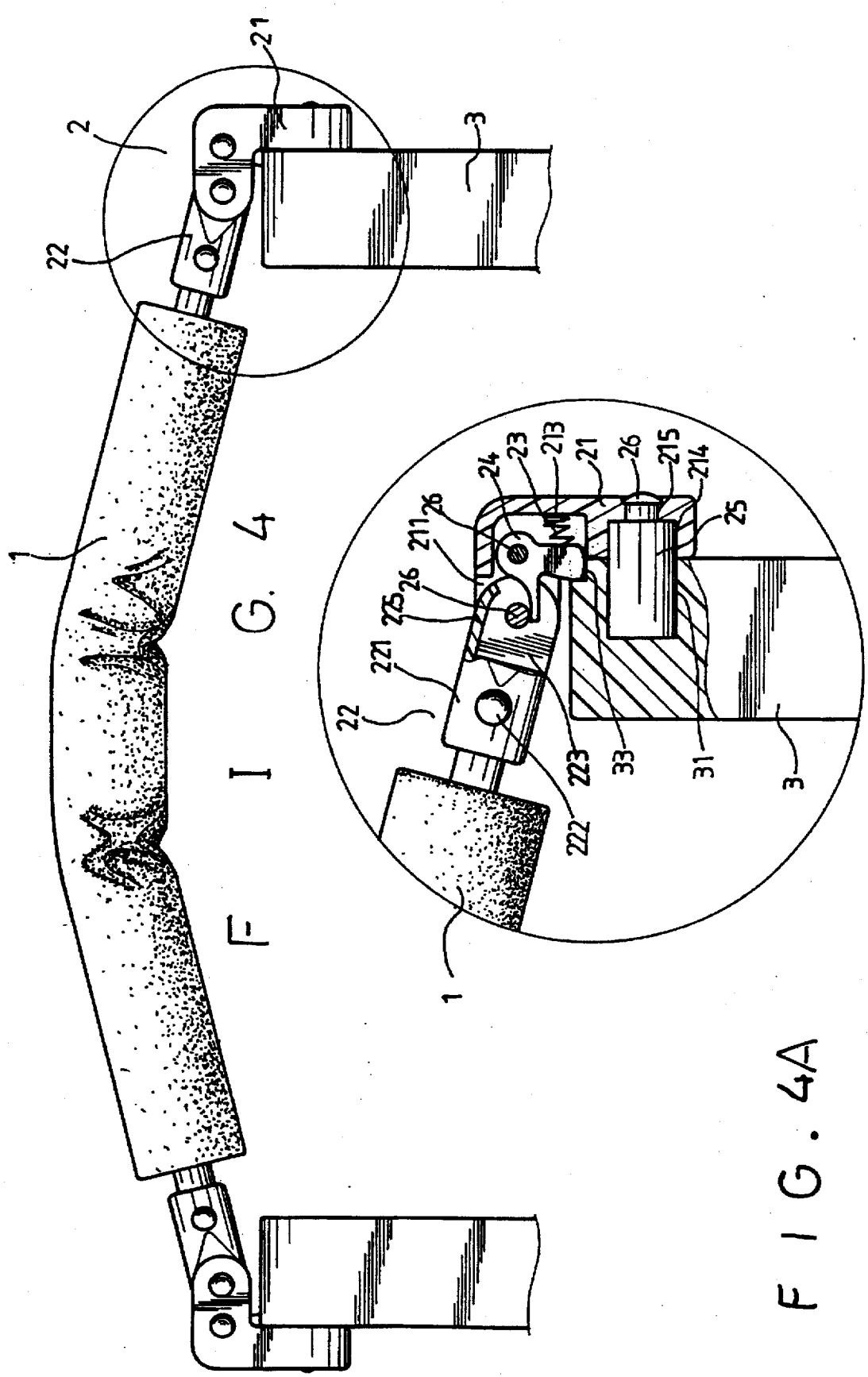
FIG. 4 is a side view showing a setting state of the present invention.
Figure 5:
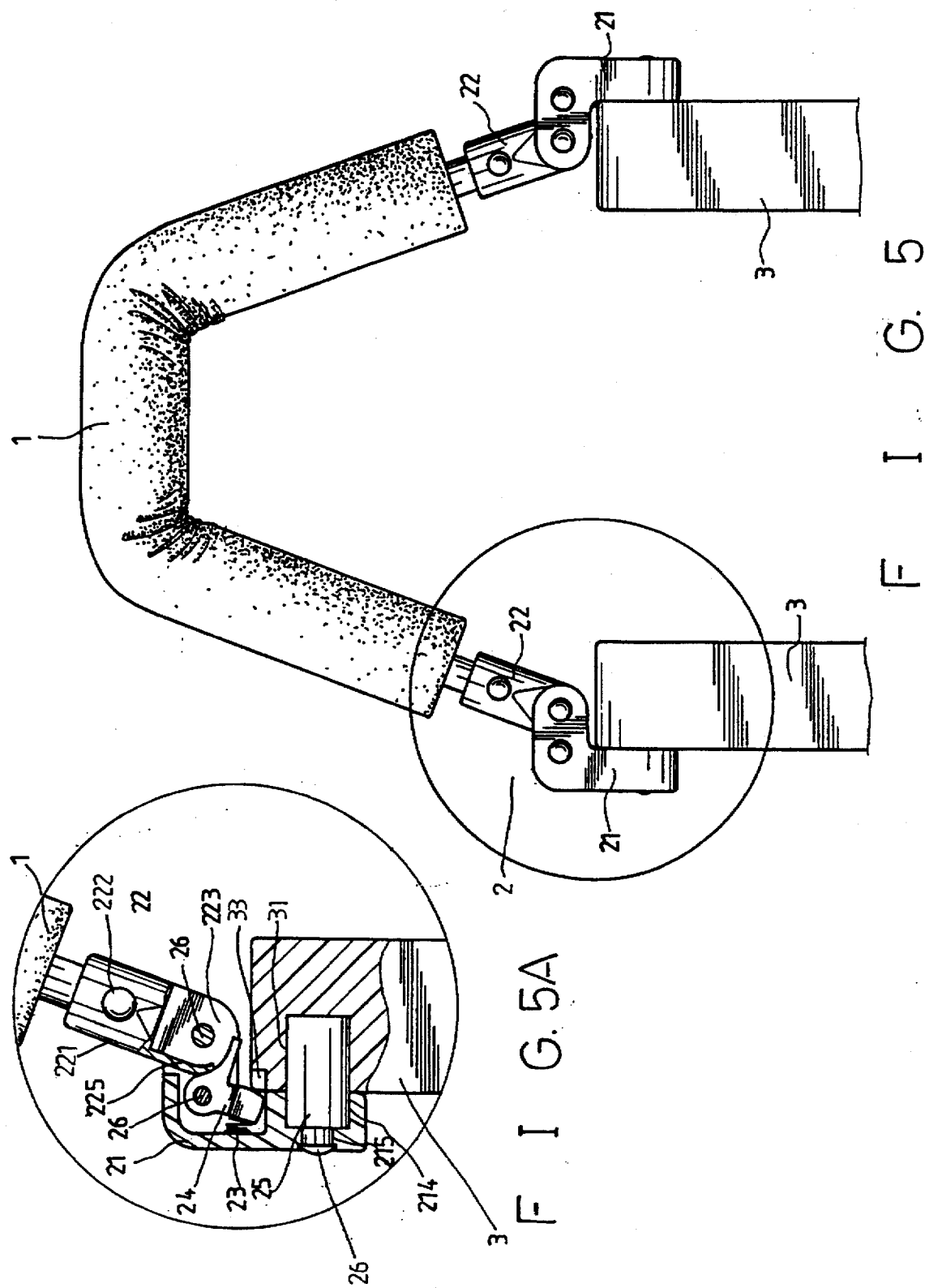
FIG. 5 is a side view showing a releasing state in withdrawing of the present invention.
Figure 6:
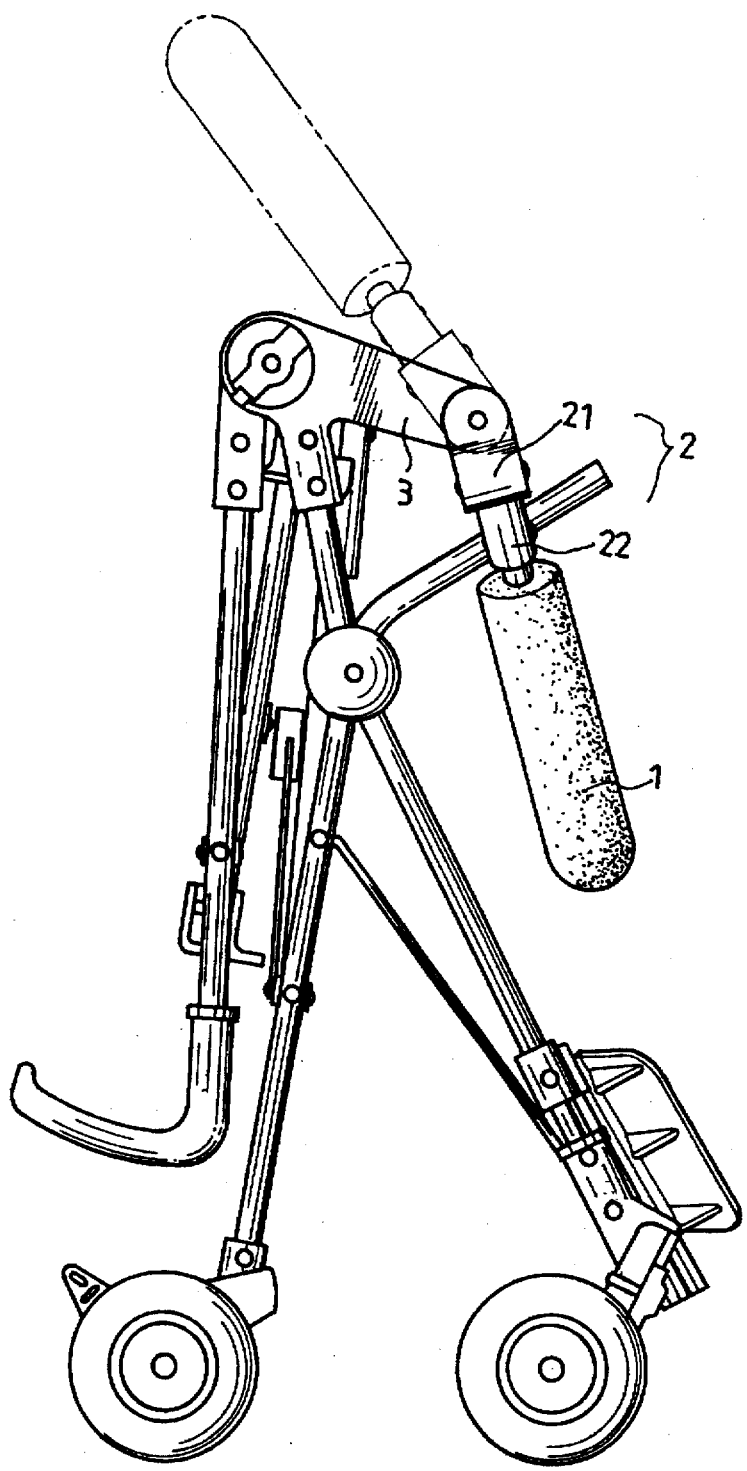
FIG. 6 is a side view showing a folded state coordinating body of baby carriage operation of the present invention and FIG 7 is an exploded view of the conventional baby carriage.
Figure 7:
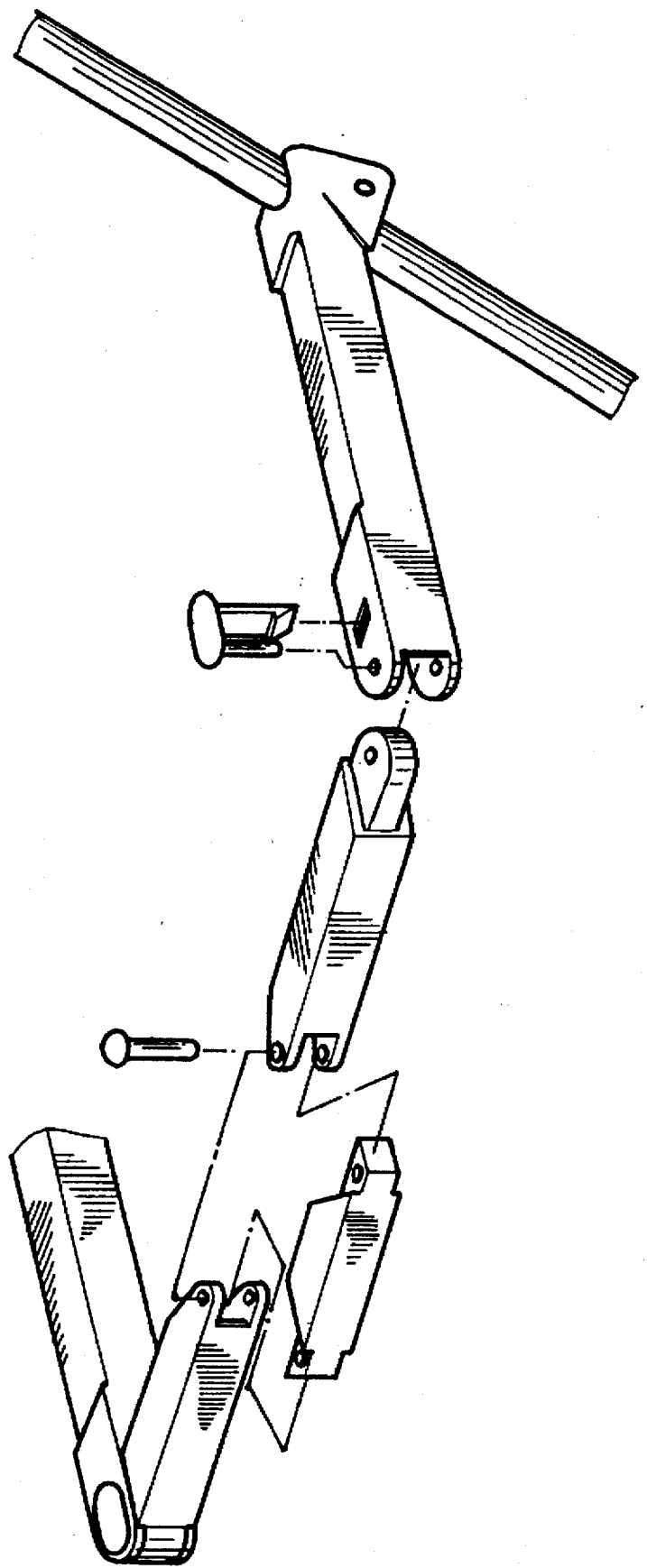

When the handrail and the baby carriage are in unfolding setting state, referring to FIG. 3 and FIG. 4, one end of the latch 24 is withstood into the groove 33 at the forth end edge of the arm 3 for setting handrail 1 by the spring 23 in the joint stand 2, the handrail is unable to bend in vertical direction (up, down direction); when the arms 3 is withdrawn to the center from right, left direction along with the carriage, the handrail 1 is bent in U-shaped on the pin joint points, referring to the FIG. 5, the butt joint 22 fixed on the two ends of handrail 1 turn an angle on the joint stand 21, during turning, the stopper 225 between the lips 223 of the butt joint 22 pulls the end of the latch 24 which end is not withstood by the spring 23, meanwhile separate away from the groove 33 on the forth end edge of the arms 3 for releasing setting state automatically, it does not need to release setting state of the handrail 1 with the arm 3, so the handrail 1 can be bent in vertical direction (up, down direction), referring to FIG. 6, in order to avoid the handrail extending out of bent carriage occupying more volume.

On the other hand, if remove the handrail 1 of the present invention, you can press back the elastic fastener 252 of the linking block 25 through the fastening hole 32 on the bottom flat of the forth end of the arm 3 directly, the linking block 25 can be pulled out rapidly from the fit channel 31, so it is convenient for removing the handrail with the toggle joint from the arms, the operation is quick and easy.

I claim:

1. An foldable frame for a baby carriage, including a pair of laterally spaced arms movable inwardly towards each other when the carriage is moved to a folded position, a flexible handrail, and a pair of two-way toggle joints for connecting opposite ends of the handrail to the pair of arms, each two-way toggle joint comprising:

a butt joint fixedly connected to a respective end of the handrail, the butt joint having a pair of spaced apart lips and a stop member extending between the lips along one side thereof; and a joint stand having a pair of spaced apart lips, the lips of the butt joint being received between the lips of the joint stand and pivotally connected thereto by means of a pivot member for permitting horizontal pivotal movement of the handrail relative to the arms, a latch member pivotally mounted between the lips of the joint stand, a spring for biasing the latch member into engagement with the pivot member, a linking block having one end pivotally connected within an aperture extending through the joint stand and an opposite end fixed within a channel formed in a respective arm, and a groove formed within a forward end of the arm for receiving a portion of the latch member when the handrail in a fully extended position for preventing pivotal movement of the joint stand relative to the arm, the latch member being disengaged from the groove by the stop member when the handrail is pivoted horizontally to a folded position for permitting vertical pivotal movement of the joint stand and the folded handrail relative to the arm.

* * * * *